United States Patent Office 3,207,533
Patented Sept. 21, 1965

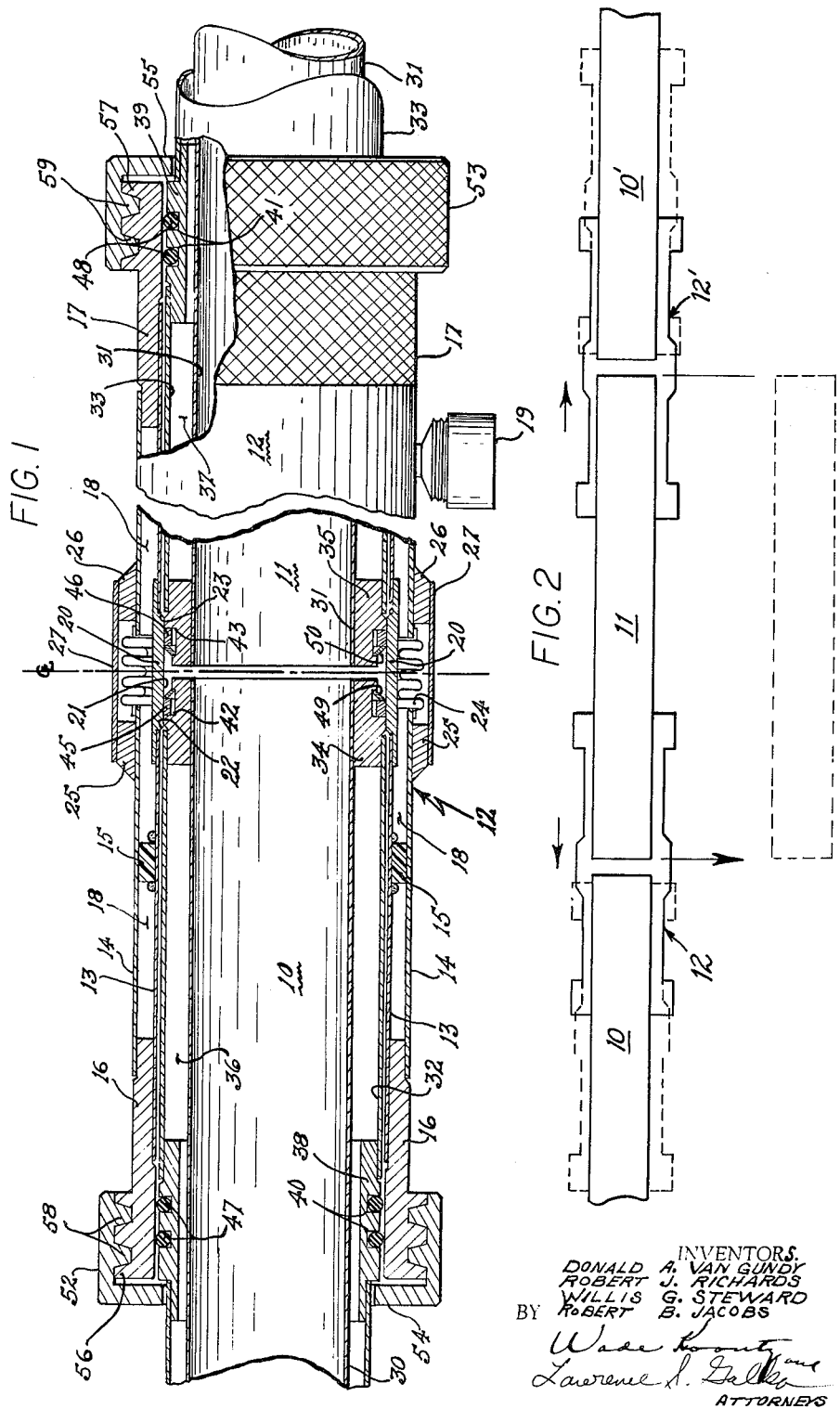

3,207,533
DOUBLE BAYONET INSULATED TRANSFER LINE COUPLING
Donald A. Van Gundy, Boulder, Robert J. Richards, Arvada, and Willis G. Steward and Robert B. Jacobs, Boulder, Colo., assignors to the United States of America as represented by the Secretary of the Air Force
Filed Jan. 17, 1963, Ser. No. 252,258
3 Claims. (Cl. 285—31)
(Granted under Title 35, U.S. Code (1952), sec. 266)

The invention described herein may be manufactured and used by or for the Government for governmental purposes without the payment of any royalty thereon.

This invention relates in general to transfer lines conveying fluids at extreme temperatures, and more particularly, to a coupling therefor.

During the transfer of liquified gases from a cryogenic source, it is essential that an extremely low temperature be maintained if changes in state from liquid to gas are to be prevented. Likewise, the transfer of molten solids necessitates the maintenance of extremely high temperatures to avoid freezing of the liquids into a solid state. Thus, fluid transfer lines, conveying fluids of extreme temperature, are usually insulated thermally by a vacuum in order to absolutely minimize thermal leakage between the fluid and ambient atmosphere. The construction of such transfer lines is most easily accomplished by coupling a series of prefabricated, vacuum insulated sections to form the desired length. Naturally, the couplings, in this instance, must not only form a fluid tight junction, but must also limit thermal leakage to an absolute minimum. Heretofore, the couplings in use have required some axial movement between mating sections during the removal and insertion of sections in need of replacement or repair. This disadvantage often requires the disassembly of an entire transfer line in order to insert or remove but one section, and thereby increases the time, effort and expense of servicing the transfer line.

Therefore, it is an object of this invention to facilitate the construction, servicing and repair of thermally insulated fluid transfer lines.

It is an object of this invention to provide a reliable, sturdy and fluid-tight coupling which limits thermal leakage to an absolute minimum and which can be economically mass produced in various sizes and shapes.

It is another object to provide a thermally insulated transfer line coupling that requires minimal time, effort and space for assembly and disassembly.

It is a further object to provide a coupling which eliminates the need for any axial movement between mating sections of a transfer line during removal or insertion of sections.

Other objects and a fuller understanding of the invention may be had by referring to the following description and claims, taken in conjunction with the accompanying drawing.

FIG. 1 of the drawing represents a partial sectional view illustrating the junction of two adjacent transfer line sections using the invented coupling.

FIG. 2 is a schematic view of three adjacent transfer line sections supported coaxially in end-to-end relationship by coupling means formed by first and second sleeves of the type shown in detail in FIG. 1.

With reference to FIG. 1 of the drawing, the transfer line junction, there shown, is formed by sliding two fluid transfer line sections 10 and 11 to adjacent positions midway within the elongated and thermally insulated sleeve 12. Thermal insulation of sleeve 12 has been afforded by the double wall configuration of inner tubing 13 and outer tubing 14, which are spaced concentrically by annular spacers similar to the one shown at 15. To prevent excess heat transfer, the annular spacers are, preferably, of an insulating material having a low thermal conductivity. Solid end-rings 16 and 17 are tightly inserted between the tubings 13 and 14, one at each end, as illustrated, to cap the configuration and enclose a hermetic space 18 therebetween. Although other means of thermal insulation may be available, the most efficient, a vacuum space, is utilized by evacuating space 18 through the valve 19. A receiving ring 20 forms the reinforced mid-portion of inner tubing 13 and provides a slightly constricted receiving and sealing surface at 21 with chamfered edges at 22 and 23. Expansion and contraction of inner tubing 13 is equally compensated for in outer tubing 14 by the centrally located expansion belows portion 24. If desired, a protective shielding may be provided about the bellows 24 by a pair of annular shoulders 25 and 26 together with associated sliding tube 27.

The double wall configurations of sections 10 and 11 are formed by concentrically spacing the fluid carrying ducts 30 and 31 within external ducts 32 and 33. As illustrated, solid annular nose pieces 34 and 35 seal the section ends and hermetically inclose spaces at 36 and 37, which are then evacuated like sleeve 12 for the purpose of thermal insulation. The external ducts 32 and 33 include reinforced portions therein forming the external collars at 38 and 39, which fit within end-rings 16 and 17 and extend slightly outward therefrom as shown. Collars 38 and 39, and nose pieces 34 and 35 all have retaining grooves provided around their peripheries at 40, 41, 42 and 43.

The aforementioned tubings, ducts, and various fittings therefore, used in constructing sections 10 and 11 and sleeve 12, should be of a material, such as stainless steel, having sufficient strength and also a relatively low expansion coefficient to avoid excessive expansion and contraction. Furthermore, those various parts should be permanently affixed together in such manner, for example, by soldering, that yields sturdy portable units capable of absorbing the normal abuses of shipping and storage without appreciable damage. Close tolerance machining of the nose pieces 34 and 35 as well as the adjoining surface 21 will allow a closer fit therebetween. The sections and sleeves may be of any mating size with the inner tubing of each sleeve having a minimum inner diameter which exceeds the maximum outer diameter of the end portions of the vacuum insulated sections, however, design considerations may require the sleeve to be of sufficient length to limit, at allowable amounts, any thermal leakage conducted through the path provided by inner tubing 13 and external ducts 32 and 33.

Sealing means making the junction fluid-tight are provided by the combination of liquid barrier rings 45 and 46 together with fluid-tight O-rings 47 and 48. Whereas, barrier rings 45 and 46 must withstand extreme temperatures, a metallic piston type is utilized which is split and springy to press firmly against surface 21. Conical retaining springs 49 and 50 contain the rings 45 and 46 within the grooves 42 and 43 by firmly pressing against the groove edges and sealing the rings 45 and 46 thereupon, as shown. To accomplish an extremely tight seal, it may be desirable to use barrier rings 45 and 46 that are of a material having an expansion coefficient differing from that of the sections and sleeve. When conveying hot fluids, barrier rings of a higher coefficient will expand at a faster rate than the surrounding receiving ring 20 and grooves 42 and 43, and thereby will result in an extremely tight contact at surface 21 and the groove edges. Conversely, for cold fluids a tight contact may be produced by the faster shrinkage rate of the receiving ring and grooves about barrier rings having a lower coefficient. Naturally, if such an extremely tight contact is not desired, or if on occasion it is desired to convey the fluid in a gaseous state at ambient temperatures, a slight leakage around rings 45 and 46 may result. Therefore, the resilient O-rings 47 and 48 have been provided within grooves 40 and 41 to form a seal with end-rings 16 and 17, respectively, as illustrated, thereby making the junction gas tight. Furthermore, additional thermal insulation is afforded by the O-rings enclosing a "dead air" space between inner tubing 13 and external ducts 32 and 33.

Means for interlocking the sections and sleeve are provided, in the preferred embodiment, by the annular members 52 and 53, each with an opening therethrough defined by the neck flanges at 54 and 55. Sections 10 and 11 are loosely received by the openings in members 52 and 53, within the encircling flanges 54 and 55, as illustrated, to slide freely therein as far as collars 38 and 39, which engage the flanges and obstruct further movement. The outermost ends of end rings 16 and 17, indicated at 56 and 57, have been externally threaded to match the internal threads 58 and 59 of members 52 and 53, and thus the engagement therebetween will securely interlock the sections 10 and 11 and the sleeve 12. Of course, various other equivalent choices exist for interlocking the coupling, such as the substitution of lugs and accommodating grooves in place of the matching threads. And clearly, the provision of one end ring with an integral neck flange would require only one annular member in engagement with the opposite end ring. It is understood then that the means described are believed to be the most convenient and practical, and thus are the preferred embodiment herein.

The assembly and disassembly of adjacent coupled sections in a fluid transfer line may now be easily accomplished. Although FIG. 1 of the drawing includes only a portion of each section 10 and 11, it is naturally understood that similar couplings are provided at each end of the sections. This is shown in FIG. 2, wherein there are illustrated a first fluid transfer line section 10, a second fluid transfer section 10', and an intermediate fluid transfer section 11. Coupling means for interconnecting the sections 10, 11 and 10' are formed by first and second sleeves 12 and 12'. The sections 10 and 10' are similar in construction. Also the sleeves 12 and 12' are similar in construction. In order to remove the intermediate section 11, the annular members (not shown in FIG. 2) receiving each end of section 11 are disengaged from their respective sleeves 12 and 12' by unscrewing them. Those sleeves, one at each end of the section, may then be slid back in opposite directions onto the adjacent sections 10 and 10' to completely expose the intermediate section 11 for removal. Easy translatory removal of intermediate section 11 laterally from the fluid transfer line may then be accomplished without requiring any axial movement of the sections. A replacement section is then placed in the vacated position and the sleeves 12 and 12' slid back over the replacement. As the sleeves are slid back, the nose piece 34 of each sleeve, as is shown in FIG. 1, for example, enters within receiving ring 20 while the sealing ring 45 first contacts surface 21 at chamfer 22. While passing the incline of chamfer 22, the piston-type split ring 49 is slightly compressed to firmly contact surface 21. The annular members are re-engaged with their respective sleeves to interlock the replacement section therein, and thus, the transfer line is again assembled for use.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim:
1. In a fluid transfer line comprising at least three adjacent vacuum insulated sections supported coaxially in end-to-end relationship, coupling means for interconnecting said sections and providing for translatory removal of the intermediate section laterally from said line; said coupling means comprising first and second sleeves which slidably receive first and second end portions of said intermediate section, respectively, said sleeves also slidably receiving end portions of the sections on either side of said intermediate section, respectively, each of said sleeves being defined by an inner tubing and an outer tubing which inclose a vacuum space therebetween, the inner tubing of each sleeve having a minimum inner diameter which exceeds the maximum outer diameters of the end portions of the vacuum insulated sections, first and second sealing means positioned at different locations along the axis of each end portion to provide at least two fluid-tight seals between each end portion and the surrounding sleeve portion, one seal being located at one end of a section end portion and sealingly engaging an intermediate portion of its overlapping sleeve, the other seal being located inwardly from the one end of a section end portion and sealingly engaging the sleeve at the terminal end of said sleeve, and means for interlocking each sleeve with the two adjacent vacuum insulated sections received by the sleeves, said interlocking means being adapted to release each sleeve for sliding movement of both of said sleeves in opposite directions along said sections to position said sleeves beyond the ends of said intermediate section for translatory removal of said intermediate section laterally from said line.

2. The apparatus set forth in claim 1 wherein the inner tubing of each of said first and second sleeves includes an intermediately positioned metallic ring for receiving and engaging the one seals of adjacent end section portions, each of said one seals comprising a metallic barrier ring having an expansion coefficient differing from that of said sections and sleeves, and each of said other seals comprising at least one resilient O-ring.

3. The apparatus set forth in claim 2 wherein the outer tubing of each of said first and second sleeves includes an expansion bellows portion for compensating for expansion and contraction of the inner tubing of each sleeve.

References Cited by the Examiner

UNITED STATES PATENTS

| 1,906,826 | 5/33 | Smith. | |
| 1,986,357 | 1/35 | Perry | 285—53 |
| 2,209,152 | 7/40 | Daniels | 285—133 X |
| 2,749,154 | 6/56 | Smith | 285—348 |
| 2,785,536 | 3/57 | Hinckley. | |
| 2,980,448 | 4/61 | Holben | 285—47 |
| 3,034,319 | 5/62 | Chelton. | |
| 3,068,026 | 12/62 | McKamey | 285—47 |
| 3,137,143 | 6/64 | Jacobs et al. | 285—47 X |
| 3,152,452 | 10/64 | Bond | 62—45 |

FOREIGN PATENTS

| 794,761 | 5/58 | Great Britain. |
| 583,865 | 10/58 | Italy. |

CARL W. TOMLIN, *Primary Examiner*.